United States Patent [19]

Burger

[11] Patent Number: 4,834,159

[45] Date of Patent: May 30, 1989

[54] METHOD AND APPARATUS FOR ASSURING PROPER BEAD SEATING OF TUBELESS TIRES UPON WHEEL RIMS

[75] Inventor: Raymond M. Burger, Redford, Mich.

[73] Assignee: Allied Automation Systems, Inc., Detroit, Mich.

[21] Appl. No.: 183,835

[22] Filed: Apr. 20, 1988

[51] Int. Cl.$^4$ ............................................. B60C 25/00
[52] U.S. Cl. ........................................ 157/1; 157/1.21
[58] Field of Search ................... 157/1, 1.1, 1.17, 1.21

[56] References Cited

U.S. PATENT DOCUMENTS

| | | | |
|---|---|---|---|
| 3,343,583 | 9/1967 | Plunk | 157/1.21 |
| 3,422,875 | 1/1969 | Robinson | 157/1.21 |
| 3,658,110 | 4/1972 | Koziar | 157/1.21 |
| 3,973,615 | 8/1976 | Cunha | 157/1.21 |
| 4,183,392 | 1/1980 | Kane | 157/1.1 |
| 4,621,671 | 11/1986 | Kane et al. | 157/1.1 |
| 4,723,563 | 2/1988 | Kane | 134/144 |

Primary Examiner—James G. Smith
Attorney, Agent, or Firm—Basile and Hanlon

[57] ABSTRACT

To assure proper seating of the beads of a tubeless tire upon its wheel, after the tire has been mounted upon its wheel and inflated, the inflated tire is compressed by concave, tread-engaging members pressed against diametrically opposed, circumferential portions of the tire tread to induce a flexing sliding motion of the beads relative to the wheel and at the same time increases the internal air pressure to enable the beads to shift as required into proper seating engagement with the wheel and return the internal air pressure to design pressure when the compressive force is released.

6 Claims, 1 Drawing Sheet

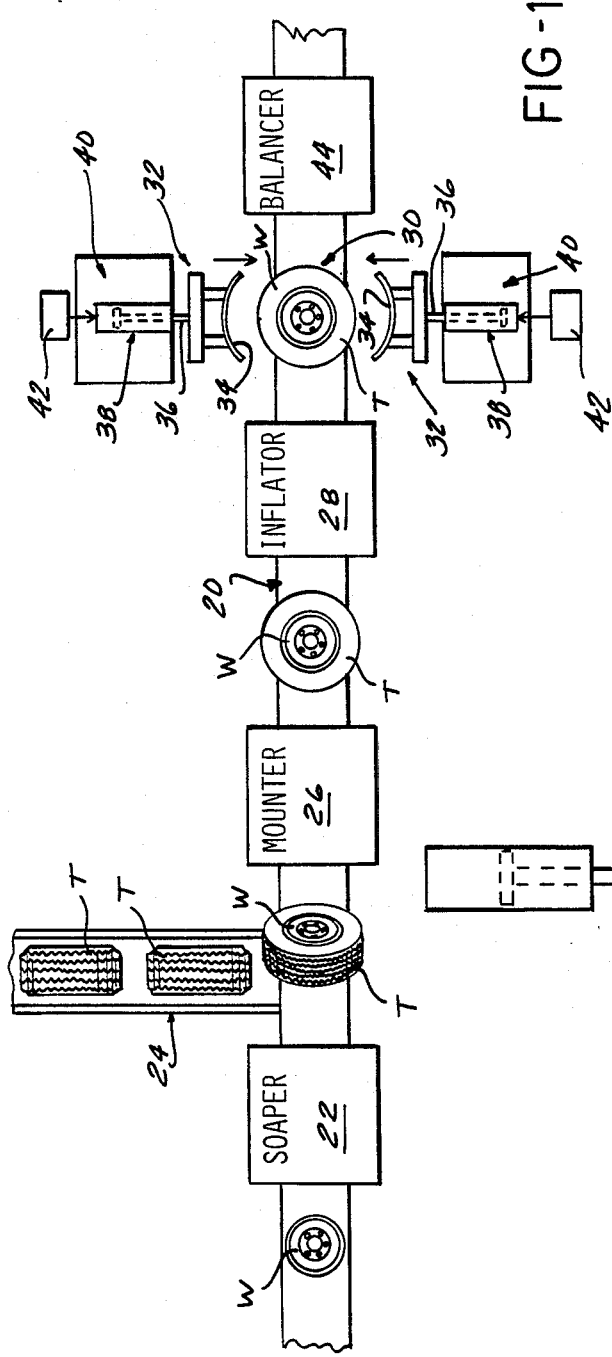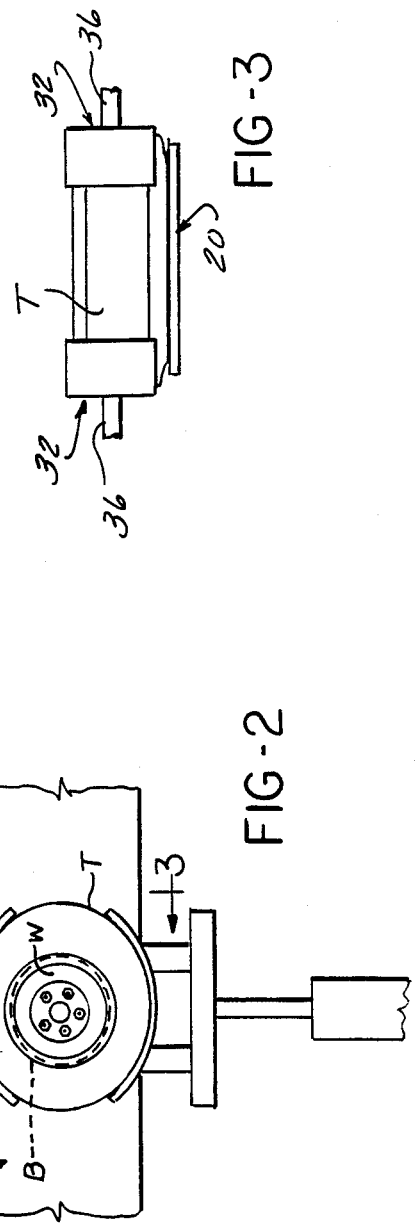

METHOD AND APPARATUS FOR ASSURING PROPER BEAD SEATING OF TUBELESS TIRES UPON WHEEL RIMS

BACKGROUND OF THE INVENTION

I. Field of the Invention

The present invention relates to method and apparatus for assuring the proper seating of beads of tubeless tires upon their wheel rims in a production line setting.

II. Description of the Prior Art

In present-day tire-wheel assembly lines, at a point on the line just prior to the tire mounting apparatus, a tubeless tire is positioned upon a horizontally disposed wheel with a relatively small circumferential portion of the beads positioned between the opposed rims of the wheel and the remainder of the tire inclined upwardly and rearwardly in a slanted position upon the wheel. The tire and wheel are then advanced to the mounter, and during passage through the mounter a horizontally disposed roller forces the beads downwardly past the uppermost rim of the wheel. See, for example, U.S. Pat. No. 4,621,671. Because the diameter of the central opening of the tire (the inner diameter of the bead) is smaller than the diameter of the wheel rim over which it must be forced, the beads are subjected to substantial stretching and twisting forces as they are forced past the wheel rim. In an attempt to facilitate the forcing of the tire over the rim, it is standard practice to apply a lubricant or soap to the wheel rim just prior to initially positioning the tire upon the wheel. This soap is chosen to have a relatively short period of effectiveness as a lubricant to minimize the possibility of slippage of the tire rotatively relative to its wheel after the assembled tire and wheel have been balanced and mounted upon a vehicle.

In the case of lighter weight, standard-sized tires, the side walls of these tires possess sufficient flexibility so that once mounted upon the wheel, prior to inflation the tires fit loosely within the wheel rim; and when the wheel and tire are in a horizontal position, the upper bead may even droop downwardly out of contact with the upper wheel rim. In the heavier tires, particularly the low-profile, wide-tread tires used on high-performance vehicles, the tire side walls are extremely stiff, and even when uninflated the mounted tire will have its beads tightly pressed against both of the opposed rims of its wheel. Experience has shown that the twisting and rolling forces exerted on the tire bead as it is forced around the rim in the mounting operation will frequently cause the beads of these high-performance tires to be mechanically wedged or trapped in a cocked or twisted position relative to the bead engaging seat on the wheel rim. The stiffness and designed tight fit of these heavier tires will frequently preserve this flawed seating through the conclusion of the inflation operation. In those cases where inflation does not result in the elimination of the flawed seating, the flaw may in effect be locked into place by the internal pressure within the tire.

While such seating flaws may, on occasion, occur with the lighter-weight, standard tires, the lighter-weight tires possess sufficient flexibility so that the flaw will usually work itself out after a few miles on the road. This self-correcting action or driving out of the flaw very seldom occurs in the case of the relatively stiff, low-profile, wide-tread tires. The flaw typically occurs near the inner circumference of the bead and it is not possible to detect the presence of the flaw by visual inspection. The existence of the flaw may manifest itself by vibrations at various critical road speeds; but typically by the time the flaw has been detected, the tire bead has been damaged to a point requiring replacement of the tire.

The prior art has recognized that problems exist in seating the beads of tubeless tires upon their wheel rims. However, most of the efforts in the prior art have been directed to apparatus operable to engage both tire beads with the wheel rim so that the tire can be inflated through the valve stem mounted on the wheel. See, for example, U.S. Pat. Nos. 3,422,875 and 3,973,615 and the prior art cited in those patents. While these last prior art devices are useful in service stations for mounting replacement tires, they are not designed to correct a flawed bead seating after a tire has been inflated to design pressure, nor are they practical for use in a production line environment which may be required to operate at line speeds of up to 400 units per hour. At these line speeds, it is not practical to attempt to inflate the tires via the wheel valve stem—the tire is inflated by means of a head which forces air under pressure into the tire between the wheel rim and one bead of the tire. See, for example, U.S. Pat. No. 4,183,392.

The prior art has also approached this problem with so-called dynamic run-in machines. In these machines, a mounted and inflated tire-wheel unit is positioned with the wheel unit axis vertical between three tread-engaging rollers mounted for rotation about vertical axes. The rollers are pressed radially inwardly against the tire tread, and one roller is driven in rotation to likewise drive the tire and wheel unit in rotation while the rollers press radially inwardly against its tread. This is intended to correct flawed bead seating by an in-plant simulation of road conditions which, as described above, will correct flawed bead seating in the lighter-weight, standard-sized tires. However, as stated above, correction by this method cannot always be accomplished in the case of low-profile, wide-tread tires. Further, the prior art dynamic run-in machines were found to be expensive to make, operate and maintain and presented a substantial safety hazard in that the rapidly rotating wheel unit was held only by the frictional grip of the tread-engaging rollers.

Another method was to inflate the tire to an extremely high pressure (e.g. 65 psI) and then bleed the pressure back through the valve stem to design pressure. This particular process was too slow and cumbersome to be practical on a production line.

The present invention is especially directed to a method and apparatus for correcting flawed bead seating which may be used upon an inflated tire-wheel unit while stationary on a tire-wheel assembly line operating at a high-production rate.

SUMMARY OF THE INVENTION

In accordance with the present invention, a vehicle wheel is passed along a production line past a wheel soaper which applies lubricant to the wheel rim, receives in a slanted position a tire to be mounted, is passed through a mounter which forces the uninflated tubeless tire onto the wheel rim and then feeds the wheel and mounted tire to an inflator which inflates the tire upon the wheel. Immediately from the inflator, the wheel unit is fed to a bead-seating station where it is located between an opposed pair of tire tread-engaging compression members. The opposed faces of the tread-engaging members are concavely curved to a radius somewhat greater than the outer radius of the tire of the wheel unit located between the two members. With the tire in a stationary position upon the conveyor between the two tire-engaging members, the members are driven inwardly toward each other to engage diametrically opposed circumferential portions of the tire tread and compress the inflated tire to deform the tire, when viewed axially, from a circular to an oval-shaped configuration. At the same time, the internal air pressure in the tire is greatly increased. This deformation of the tire causes a sliding movement of the tire beads circumferentially of the engaged rims of the wheel, this sliding movement being facilitated by the fact that the lubricating soap applied to the wheel rim to ease the mounting of the tire upon the wheel is still fresh. At the same time, the high internal air pressure forces the tire beads outward into the seat on the wheel. Seating flaws—that is, twisted or crimped sections of the tire bead resulting from the mounting operation—are enabled by the sliding, flexing action of the bead in combination with the high internal air pressure to assume their proper position in seated engagement with the wheel rim prior to subsequent conveyance from the seating station to the wheel balancing unit of the production line. When the tread-engaging members of the bead seating device are retracted, the internal pressure returns automatically to design pressure.

The tread-engaging members of the bead seating device may be driven in reciprocatory movement, as by pneumatic motors, between a retracted position accommodating conveying movement of tire and wheel units to and from the seating station between the tread-engaging members and the actuated position in which the tread-engaging members compress the inflated tire as described above.

Other objects and features of the invention will become apparent by reference to the following specification and to the drawings.

BRIEF DESCRIPTION OF THE DRAWINGS

FIG. 1 is a schematic top plan view of a portion of a tire-wheel assembly line including a bead seating station embodying the present invention;

FIG. 2 is a top plan view of a bead seating device embodying the present invention showing the device compressing the inflated tire; and FIG. 3 is a cross-sectional view taken on the line 3—3 of FIG. 2.

DESCRIPTION OF THE PREFERRED EMBODIMENT

Referring first to FIG. 1, there is shown a top plan view of a portion of a tire-wheel assembly line which includes a schematically illustrated conveyor designated generally 20 operable to intermittently convey wheels or tire and wheel units in a direction from left to right as viewed in FIG. 1. Proceeding from left to right in FIG. 1, vehicle wheels W are conveyed in a horizontal position (wheel axis vertical) along conveyor 22 in spaced succession to a soaper 22 of known construction. See, for example U.S. Pat. No. 4,723,563. While the conveyor is stationary, the wheel rim is sprayed with a lubricating soap. While the wheel is being soaped, a tire T is rolled onto conveyor 20 in an upright position from a tire supply line designated generally 24, the release of tires T from line 24 being regulated by conventional, well-known apparatus.

Conveyor 20 is then actuated to move rightwardly in a next step of movement, and during this movement the tire T upon the conveyor is tilted into a slanted position upon the advancing wheel unit and advanced into and through a mounter 26 of known construction which presses the beads of the tilted tire downwardly and forces them downwardly over the upper rim of the wheel W so that the tire beads are located between the opposed rims of the wheel. See, for example, U.S. Pat. No. 4,621,671.

The forcing of the tire beads over the rim in the foregoing manner applies substantial stresses to the beads. The beads are subjected to substantial tension circumferentially during the mounting operation because the central opening of the tire—the inner diameter of the bead—is smaller than the diameter of the wheel rim over which it is forced. This tension in turn applies substantial forces to the bead which press the bead downwardly against the upper surface of the wheel rim at those locations where the bead is just about to be forced below the rim. This force reaches a maximum just at the point the bead is required to slide around the edge of the wheel rim and causes the bead to twist or roll somewhat upon the rim as it passes over the edge of the rim.

The characteristics of the heavier and stiffer high-performance tires are such that the bead recovers only relatively slowly from the distortion resulting from the mounting operation. Further, these tires are so designed as to tightly fit upon their wheel—that is, with both beads pressed quite tightly against the bead seats on the wheel even when the tire is not inflated. Thus, this latter engagement between the beads and the wheel rim tends to retain the beads in their distorted condition as the wheel, with its mounted tire, is conveyed from mounter 26 to inflator 28.

Within the inflator, an inflation head is lowered to temporarily press the upper bead of the tire within the inflator downwardly clear of the upper rim of the wheel to supply air under pressure to the interior of the tire to inflate the tire upon the rim. See, for example, U.S. Pat. No. 4,183,392. While this action temporarily disengages the upper bead of the tire from the wheel, there frequently is insufficient time for the distorted bead to fully recover to its normal configuration before the inflation operation is completed and the bead is again firmly pressed against its seat. At the conclusion of the inflation operation, the wheel and inflated tire are discharged from inflator 28. With the tire now fully inflated, the internal pressure within the tire effectively clamps the beads into a fixed relationship with the wheel. If any portion of the bead was distorted at the completion of the inflation operation, this distortion is firmly maintained by the internal pressure in the tire, and the bead is not properly seated. Typically, this improper seating is not gross enough to result in air leakage from the tire and cannot be detected by visual inspection. In the usual case, the improper seating is discovered only after some road usage; and usually by the time the fault is discovered, the bead is damaged to the point the tire must be replaced.

In accordance with the present invention, immediately after being discharged from inflator 28, the wheel with its inflated tire is advanced along conveyor 20 to a bead seating station designated generally 30. At station 30, the wheel and tire are stopped at a position between a pair of tire compressing devices 32 mounted at opposite sides of conveyor 20. Each of the compressing devices 32 includes a concavely curved, tread-engaging member 34 mounted upon the piston rod 36 of a horizontally disposed pneumatic cylinder 38 which is in turn fixedly mounted upon a fixed frame designated generally 40. Cylinders 38 may be actuated in a well-known manner to drive the tread-engaging members 34 in horizontal reciprocatory movement between their retracted positions shown in FIG. 1 and a tire-compressing, extended position shown in FIG. 2. Cylinders 38 are actuated by a valve controlled source of air under pressure, such as schematically illustrated at 42, in a well-known conventional manner.

As best seen in FIG. 3, the tread-engaging members 34 of a width such as to engage substantially the entire tread width of the tire and are mounted at an elevation such that the lower edges of members 34 will clear conveyor 20. The radius of curvature of the concave members 34 is somewhat greater than the outer radius of the tire T.

When the tire and wheel unit WT has been located in the position shown in FIG. 1 between the retracted treadengaging members 34, cylinders 38 are actuated to drive the opposed members 34 inwardly toward each other into engagement with diametrically proposed circumferential portions of the tread of tire T as shown in FIG. 2. The compressive force applied by members 34 to the tire T is sufficient to deform the tire from its original circular shape into an oval shape as shown in FIG. 2. This oval deformation of the tire causes a similar deformation of the tire beads B and causes the beads to slide relative to the engaged surfaces of the wheel rim. This sliding action is assisted to some extent by the fact that the soap applied to the wheel rim to lubricate mounting of the tire has not dried and will to some extent lubricate this sliding movement. The sliding movement of the bead relative to the wheel rim frees the grip of the wheel upon the bead, without disturbing the air seal, while the increased internal pressure within the tire tends to firmly press the bead against the seat. The relative sliding movement between the bead and wheel, and the increased internal pressure developed by the compressive action of tread-engaging members 34 and the flexing of the bead, combine to enable the bead to move into the proper seating engagement with its wheel as the compressive force is released by the retraction of tread-engaging members 34 back to their original retracted position.

After tread-engaging members 34 have been returned to their retracted position, the wheel and tire unit is advanced along conveyor 20 to a balancer unit 44.

While one embodiment of the invention has been described in detail, it will be apparent to those skilled in the art the disclosed embodiment may be modified. Therefore, the foregoing description is to be considered exemplary, rather than limiting, and the true scope of the invention is that defined in the following claims.

What is claimed is:

1. Apparatus for assuring proper seating of the beads of a tubeless tire upon the rim of a wheel comprising conveying means for conveying a wheel unit consisting of a fully inflated tubeless tire mounted on the rim of a wheel in intermittent step-by-step movement along a predetermined path to a bead seating station, a pair of opposed compression members mounted at said seating station at locations at opposite sides of said path to be disposed at diametrically opposite sides of a wheel unit located at said seating station by said conveying means, said compression members having facing opposed tire tread-engaging faces concavely curved symmetrically with respect to and bisected by a plane normal to said path and containing the axis of a wheel unit located at said seating station, drive means operable between successive steps of movement of said conveying means for driving said compression members from a retracted position accommodating movement of a wheel unit along said path to and from said seating station to and from an actuated position wherein said tread-engaging faces engage and compress toward each other diametrically opposed circumferential portions of the tread of the inflated tire of a wheel unit at said station to enable the beads of the inflated tire to shift, if necessary, to a properly seated position upon the wheel.

2. The invention defined in claim 1 wherein the radius of curvature of said concavely curved, tire tread-engaging faces is greater than the outer radius of said tire.

3. The invention defined in claim 1 wherein said compression members are mounted for movement between said retracted and said actuated positions along a path normal to said wheel unit axis and lying in said plane containing said axis.

4. In a tubeless tire-wheel assembly line including a wheel soaper, a tire mounter for mounting a tire upon a soaped wheel, a tire inflator for inflating a tire mounted upon a wheel and conveying means for conveying a wheel having an inflated tire thereon in a horizontal position from said inflator to a work station;

tire bead seating means at said work station comprising a pair of opposed, arcuate, tire tread-engaging members mounted adjacent respective opposed sides of said conveying means for movement into and out of engagement with the tread of an inflated tire positioned between said members at said work station, and drive means coupled to said members operable to drive said members against diametrically opposed portions of the tread of an inflated tire to compress said tire and increase internal air pressure and to induce relative movement between the beads of said inflated tire and the wheel upon which said inflated tire is mounted.

5. The method of seating the beads of a tubeless tire upon a wheel rim comprising the steps of:
 (1) mounting an uninflated tubeless tire upon a wheel rim,
 (2) fully inflating the mounted tire upon the wheel rim, and
 (3) radially compressing diametrically opposed circumferential portions of the tread of the inflated tire toward each other to deform the inflated tire into a substantially oval configuration as viewed axially of the wheel.

6. The method of mounting and seating the beads of a tubeless tire on a wheel rim comprising the steps of applying a soap to the wheel rim to facilitate mounting of said tire, mounting the tire upon the soaped wheel rim, inflating said tire, and radially compressing the tread of the inflated tire at two diametrically opposed locations to deform the tire and increase its internal pressure while said soap is still effective to facilitate shifting of the beads of said tire relative to said rim into a fully seated position.

* * * * *